United States Patent [19]
Walz et al.

[11] Patent Number: 5,310,855
[45] Date of Patent: May 10, 1994

[54] AROMATIC CONDENSATION PRODUCTS

[75] Inventors: Klaus Walz; Udo Hendricks; Hans-Albert Ehlert, all of Leverkusen; Fritz Lesszinsky, Bergisch Gladbach, all of Fed. Rep. of Germany

[73] Assignee: Bayer Aktiengesellschaft, Leverkusen, Fed. Rep. of Germany

[21] Appl. No.: 976,290

[22] Filed: Nov. 13, 1992

Related U.S. Application Data

[62] Division of Ser. No. 751,270, Aug. 28, 1991, abandoned.

[30] Foreign Application Priority Data

Sep. 7, 1990 [DE] Fed. Rep. of Germany ....... 4028534

[51] Int. Cl.$^5$ .......................... C08G 8/18; C08G 8/28
[52] U.S. Cl. .................... 528/137; 528/129; 528/143; 528/148; 528/150; 528/162; 528/169
[58] Field of Search ............... 528/129, 137, 143, 148, 528/150, 162, 169

[56] References Cited

U.S. PATENT DOCUMENTS

| | | | |
|---|---|---|---|
| 2,036,161 | 3/1936 | Schuette | 528/150 |
| 3,790,344 | 2/1974 | Frickenhaus et al. | 8/165 |
| 4,079,040 | 3/1978 | Ribka et al. | 528/143 |

FOREIGN PATENT DOCUMENTS

| | | |
|---|---|---|
| 0026314 | 4/1981 | European Pat. Off. . |
| 1960616 | 6/1971 | Fed. Rep. of Germany . |
| 1961369 | 6/1971 | Fed. Rep. of Germany . |
| 2609531 | 9/1977 | Fed. Rep. of Germany . |
| 1283284 | 7/1972 | United Kingdom . |
| 1291784 | 10/1972 | United Kingdom . |

OTHER PUBLICATIONS

Kirk-Othmer Encyclopedia of Chemical Technology 3rd ed., vol. 22, pp. 107, 148–159.
Methoden Der Organischen Chemie, vol. XIV/2, 1963, pp. 263–272.
Internationales Lexikon Textilveredlung + Grenzgebiete, 1975, 917–922.
Ullmanns Encyklpadie der technischen Chemie, vol. 16, Verlag Chemie, Weinheim, New York, pp. 140–143.

*Primary Examiner*—John Kight, III
*Assistant Examiner*—Richard Jones
*Attorney, Agent, or Firm*—Sprung Horn Kramer & Woods

[57] ABSTRACT

The aromatic formaldehyde condensation products, which are substantially colorless and water-soluble and contain sulphonate and/or carboxylate groups, are obtainable by adding agents which have a reducing action during and/or after the condensation reaction, and are suitable for the treatment of textiles and leather.

5 Claims, No Drawings

AROMATIC CONDENSATION PRODUCTS

This application is a division of application Ser. No. 07/751,270 filed Aug. 28, 1991, now abandoned.

BACKGROUND OF THE INVENTION

The present invention relates to aromatic formaldehyde condensation products which are substantially colourless and water-soluble and contain sulphonate and/or carboxylate groups.

Water-soluble aromatic formaldehyde condensation products are known per se (see Ullmanns Enzyklopädie der technischen Chemie (Ullmann's encyclopaedia of technical chemistry) Volume 16 (1979), pages 140 et seq.) and can be prepared by the processes reported on there or by processes such as are described, for example, in Houben-Weyl: "Methoden der organischen Chemie" (Methods of organic chemistry) Volume 14/2, pages 263–292, G. Thieme Verlag Stuttgart (1963), or in German Offenlegungsschrift 1,960,616 and German Offenlegungsschrift 1,961,369.

However, the known aromatic formaldehyde condensation products have a strong intrinsic colour, which has proved very disadvantageous, particularly when these products are used in the textile field.

SUMMARY OF THE INVENTION

The present invention relates to aromatic formaldehyde condensation products which are substantially colourless and water-soluble and contain sulphonate and/or carboxylate groups and which are characterised in that they are obtainable by adding agents having a reducing action, with the exception of sodium sulphite, sodium bisulphite and sodium pyrosulphite, during and/or after the condensation reaction, and to the use thereof for the treatment of textiles and leather.

Compared with the known aromatic formaldehyde condensation products, the products prepared in accordance with the invention are distinguished by a drastically reduced intrinsic colour. In addition, the tendency to yellowing, with and without the action of light, of textiles treated with these products is substantially reduced, whether they are used in the dyebath or as an after-treatment.

DETAILED DESCRIPTION OF THE INVENTION

Water-soluble condensation products containing sulphonate and/or carboxylate groups are to be understood as meaning oligomeric or polymeric products which are obtainable by the condensation with formaldehyde of one or more aromatic and, if appropriate, non-aromatic compounds capable of undergoing condensation, in which at least one of the aromatic compounds must contain at least one sulphonate and/or carboxylate group, or in which the sulphonate groups are introduced during or after the condensation reaction.

Examples of suitable aromatic compounds capable of undergoing condensation are benzene and naphthalene derivatives each of which is substituted by $C_1$–$C_4$-alkyl and/or hydroxyl and/or cycloalkyl and/or $C_1$–$C_4$-alkoxy and/or $C_1$–$C_4$-hydroxyalkoxy and/or aroxy and/or aralkoxy and/or carboxyl and/or carboalkoxy and/or sulphonate and/or arylsulphonyl radicals.

The following may be mentioned as examples: xylene, mesitylene, phenol, cresols, xylenols, butylphenol, cyclohexylphenol, anisole, phenoxyethanol, phenoxypropanol, phenoxyacetic acid, phenolsulphonic acid, anisolesulphonic acid, diphenyl ether, ditolyl ether, dihydroxydiphenyl sulphone, 2,2-bis-4-hydroxyphenylpropane, 4-hydroxydiphenyl sulphone, bis-(hydroxyethoxyphenyl) sulphone, salicylic acid, 4-hydroxybenzoic acid, naphthalene, naphthols, isobutylnaphthalene, naphtholsulphonic acids, naphthyl methyl ether, biphenylsulphonic acid, sulphonated dihydroxydiphenyl sulphone and diphenyl-ether-sulphonic acid.

In addition to the aromatic compounds capable of undergoing condensation, it is also possible, in addition, to employ, for the preparation of the water-soluble condensation products, non-aromatic compounds capable of condensation, such as, for example, urea, thiourea, ethyleneurea, ethylenethiourea and/or melamine.

The introduction of sulphonate groups during or after the condensation reaction can be effected in a customary manner, for example by reaction with sulphur trioxide, sulphuric acid or chlorosulphonic acid, or by reaction with formaldehyde and sulphites or bisulphites.

Water-soluble condensation products which are particularly preferred are those prepared by the joint condensation of dihydroxydiphenyl sulphone and phenolsulphonic acid and/or biphenylsulphonic acid and/or dihydroxybiphenylsulphonic acid and/or ditolyl-ether-sulphonic acid and/or naphthalenesulphonic acids and/or hydroxybenzoic acids with formaldehyde. Other condensation products which are particularly preferred are obtained by the condensation of dihydroxydiphenyl sulphone with formaldehyde and alkali metal sulphites or bisulphites, and of dihydroxydiphenyl-sulphone-sulphonic acids with formaldehyde.

Customary reducing agents which can be employed in chemical reactions can be used as the agents having a reducing action. The following may be mentioned as examples: hydrogen, activated hydrogen, metal hydrides, such as sodium hydride, sodium borohydride or lithium aluminium hydride, sulphur compounds having a reducing action, such as sulphites, with the exception of sodium sulphite, bisulphites, with the exception of sodium bisulphite, hydrosulphites, pyrosulphites, with the exception of sodium pyrosulphite, dithionites, thiosulphates, sulphoxylates, hydroxymethanesulphinates, sulphinates or thiourea dioxide, phosphorus compounds having a reducing action, such as phosphorous acid or hypophosphorous acid or salts thereof, and also organic reducing agents, such as glucose, gluconic acid or hydroxyacetone.

The amounts of agents having a reducing action to be employed are 0.1 to 20%, preferably 0.5 to 10% (relative to the finished condensation product).

In a preferred embodiment one or more complex-formers are added before, during and/or after the condensation reaction. Customary complex-forming agents, such as are described, for example, in C. H. Fischer-Bobsin: Internationales Lexikon, Textilveredlung und Grenzgebiete (International dictionary of textile finishing and related fields), 4th edition 1975, A. Laumannsche Verlagsbuchhandlung, Dülmen, page 918 et seq., can be used as such complex-formers.

Examples of suitable complex-formers are: tartaric acid, citric acid, nitrilotriacetic acid, ethylenediaminetetraacetic acid and polyaminopolycarboxylic acids or alkali metal or ammonium salts thereof, condensed phosphates, such as, for example, sodium tripolyphosphate or metaphosphate, and also phosphonic acids, in particular phosphonic acids or salts thereof containing carboxyl groups and/or hydroxyl groups and/or amino groups, such as, for example, phosphonosuccinic acid, 2-phosphono-1,2,4-butanetricarboxylic acid, aminomethanephosphonic acid, amino-trismethylenephosphonic acid, hydroxymethanephosphonic acid, hydroxyethanephosphonic acid, hydroxyethanediphosphonic acid, hydroxyethylaminomethylenephosphonic acid or diethylenetriamine-pentamethylenephosphonic acid or alkali metal or ammonium salts thereof.

The complex-formers can be employed in amounts of 0.1–10%, preferably 0.5–5%, relative to the condensation products. Preferred preparations are obtained if the aromatic condensation products are prepared in the presence of

- 0.5–10% of a reducing agent, in particular alkali metal or ammonium hydroxymethanesulphinates or dithionites or thiourea dioxide, and
- 0.5–5% of a complex-former, in particular nitrilotriacetic acid, ethylenediaminetetraacetic acid, hydroxyethanediphosphonic acid and aminomethylenephosphonic acids, or if these agents are added to the finished condensation products in aqueous solution and, if appropriate, the mixture is heated at 30° to 100° C. for a short time.

In addition to the components mentioned in the preferred embodiment, the preparations according to the invention can also contain other constituents, such as solvents, solubilisers, anionic or nonionic polymers, emulsifiers, anti-foaming agents and others.

The condensation products and preparations prepared in accordance with the invention can be employed in various industrial fields, such as, for example, as dispersing agents for water-insoluble solids, for example dyestuff or pigments, resists and agents for improving fastness in textile dyeing, tanning agents or in the stain-repellent finishing of textile materials composed of, for example, synthetic polyamide fibres.

EXAMPLE 1

134 parts of phenolsulphonic acid, 50 parts of water, 250 parts of 4,4'-dihydroxydiphenyl sulphone and 45 parts of 45% strength sodium hydroxide solution are mixed in a pressure vessel and 90 parts of 30% strength formaldehyde solution are then added. After the vessel has been closed it is heated with stirring to 120° C. and condensation is carried out at this temperature for 5 hours. After cooling to approx. 80°–90° C., 300 parts of water are added, whereupon a dark brown viscous solution A is formed.

338 parts of water, approx. 20 parts of sodium hydroxide solution (45% strength) and 15 parts of thiourea dioxide are added to 626 parts of this solution A, and the mixture is stirred for 30 minutes at 20°–30° C. and is then heated slowly to 90° C. Approx. 1000 parts of a light-coloured solution having a colour number of 7–10 are obtained.

A solution, prepared for comparison, of the condensation product at the same concentration was prepared by diluting solution A with 373 parts of water. The solution obtained has a colour number of 500–600.

EXAMPLE 2

27 parts of ethylene glycol, 1.5 parts of sodium hydroxide solution (45% strength), 8.2 parts of thiourea dioxide and 120 parts of water are added to a condensation product, prepared in accordance with Example 1, of 112 parts of technical dihydroxydiphenyl sulphone, 41 parts of technical phenolsulphonic acid (65% strength solution in water), 40 parts of sodium hydroxide solution (45% strength), 46 parts of formaldehyde (30% strength) and 150 parts of water, and the mixture is heated at 90°–95° C. for 1 hour with stirring. Approx. 540 parts of a pale brown solution (colour number 30) are obtained.

A solution of the same concentration, but without aftertreatment with thiourea dioxide, has a colour number of 900–1000.

EXAMPLE 3

125 parts of dihydroxydiphenyl sulphone, 25 parts of sodium sulphite, 18 parts of sodium hydroxide solution (45% strength), 56 parts of formaldehyde solution (30% strength) and 257 parts of water are mixed in a pressure vessel. After the vessel has been closed it is heated at 120°–125° C. with stirring and condensation is carried out for 24 hours.

3 parts of sodium hydroxymethanesulphinate, 2 parts of nitrilotriacetic acid and 67 parts of water are added to 127 parts of the solution obtained above, and the mixture is stirred at room temperature for 12 hours. Approx. 200 parts of a nearly colourless solution are obtained (colour number 4–7).

A solution having a colour number of 300–400 is obtained by diluting, to the same content of active compound, the solution obtained in the preparation of the condensation product.

EXAMPLE 4

8.4 parts of sodium hydroxide solution (45% strength), 6 parts of sodium hydroxymethanesulphinate, 152 parts of water and 2.4 parts of hydroxyethane-1,1-diphosphonic acid are added to 209 parts of the solution A prepared in accordance with Example 1, and the mixture is stirred for 1 hour at room temperature. It is then heated at 80°–90° C. for 30 minutes. Approx. 375 parts of a nearly colourless solution are obtained (colour number 5–10).

EXAMPLE 5

82.8 parts of 98% strength sulphuric acid are added to 117 parts of diphenyl ether and the mixture is stirred at 130° to 140° C. for 4 hours. After it has cooled to 50° to 60° C., 180 parts of water, 160 parts of technical dihydroxydiphenyl sulphone and 106 parts of a 30% strength aqueous solution of formaldehyde are added. The mixture is heated to 90° to 95° C. and is stirred at this temperature for 6 hours. After it has cooled to 60° to 70° C., 400 parts of water and 180 parts of 25% strength sodium hydroxide solution are added. Clarification by filtration gives a solution having a solids content of 32%, a viscosity of 8.4 mPa.s at 20° C. and an iodine colour number of 250 to 300.

100 g of the solution are heated with 1.5 parts of sodium dithionite and 0.6 part of hydroxyethane-1,1-diphosphonic acid at 90° to 95° C. for 30 minutes under an atmosphere of nitrogen. A solution having a colour number of 4 to 7 is obtained.

EXAMPLE 6

80 parts of 98% strength sulphuric acid are added at room temperature to 68.8 parts of anisole, and the mixture is then stirred at 90° to 95° C. for 30 minutes. 60 parts of water, 115 parts of technical dihydroxydiphenyl sulphone and 78 parts of 30% strength aqueous formaldehyde solution are added, and the mixture is heated slowly to 100° to 105° C. and is stirred for 3 hours at this temperature. The supernatant solution is poured off from the resin formed, and 400 parts of water and 260 parts of 20% strength sodium hydroxide solution are added to the resin, and the mixture is stirred at 60 to 70° C. until solution takes place. Clarification by filtration gives a solution having a solids content of 28.5%, a viscosity of 5.3 mPa.s at 20° C. and an iodine colour number of 160 to 200.

100 g of the solution are heated with 3 parts of sodium dithionite and 0.6 part of hydroxyethane-1,1-diphosphonic acid at 90° to 95° C. for 30 minutes under an atmosphere of nitrogen. A solution having a colour number of 7 is obtained.

What is claimed is:

1. A method of producing a substantially colorless, water-soluble aromatic formaldhyde-condensation product containing sulphonate or carboxylate groups, comprising adding from 0.1 to 20% (by weight of the finished condensation product) of a reducing agent during or after the condensation reaction of formaldehyde with at least one aromatic compound capable of undergoing condensation therewith, said aromatic compound being selected from the group consisting of xylene, mesitylene, phenol, cresols, xylenols, butylphenol, cyclohexylphenol, anisole, phenoxyethanol, phenoxypropanol, phenoxyacetic acid, phenolsulphinic acid, anisole-sulphonic acid, diphenyl ether, ditolyl ether, dihydroxydiphenyl sulphone, 2,2-bis-4-hydroxyphenylpropane, 4-hydroxydiphenyl sulphone, bis-(hydroxyethoxyphenyl) sulphone, salicylic acid, 4-hydroxybenzoic acid, naphthalene, naphthols, isobutylnaphthalene, naphtholsulphonic acids, naphthyl methyl ether, biphenylsulphonic acid, sulphonated dihydroxydiphenyl sulphone and diphenyl-ethersulphonic acid, optionally in the presence of at least one non-aromatic compound capable of undergoing condensation, the reducing agent being selected from the group consisting of hydrogen, activated hydrogen, metal hydride, dithionite, thiosulfate, sulphoxylate, hydroxymethanesulphinate, sulphinate, thiourea dioxide, phosphorous acid, hypophosphorous acid and salts thereof.

2. The method according to claim 1, wherein the non-aromatic compound capable of undergoing condensation is selected from the group consisting of urea, thiourea, ethyleneurea, ethylenethiourea and melamine.

3. The method according to claim 1, wherein the aromatic condensation product is prepared in the presence of
   0.5–10% of an alkali metal or ammonium hydroxymethanesulphinate or dithionite, or thiourea dioxide, as reducing agent, and
   0.5–5% of nitrilotriacetic acid, ethylenediaminetetraacetic acid, hydroxyethanediphosphonic acid or aminomethylenephosphonic acid as a complex former.

4. The method according to claim 1, wherein the water-soluble condensation product is obtained by the condensation of dihydroxy-diphenyl sulphone and phenolsulphonic acid.

5. The method according to claim 1, wherein thiourea dioxide or an alkali metal or ammoniumsulphinate or dithionite is used as the agent having a reducing action.

* * * * *